United States Patent [19]

Ono et al.

[11] 4,183,842
[45] Jan. 15, 1980

[54] METHOD FOR CLEAR-COLORING OF LINEAR AROMATIC POLYESTER

[75] Inventors: Seibei Ono, Nagaokakyo; Kouichi Shibuya; Hiroshi Marikawa, both of Takatsuki, all of Japan

[73] Assignee: Dainippon Ink & Chemicals, Inc., Tokyo, Japan

[21] Appl. No.: 816,731

[22] Filed: Jul. 18, 1977

[30] Foreign Application Priority Data

Jul. 22, 1976 [JP] Japan .................................. 51-86627
Mar. 30, 1977 [JP] Japan .................................. 52-34667

[51] Int. Cl.$^2$ ............................ C08K 5/48; C08K 5/34
[52] U.S. Cl. ................................ 260/40 P; 549/52; 549/56; 546/32
[58] Field of Search ...................... 260/282, 332, 40 P; 546/32

[56] References Cited

U.S. PATENT DOCUMENTS

| | | | |
|---|---|---|---|
| 1,990,256 | 2/1935 | Stoecklin et al. | 260/332 |
| 2,044,796 | 6/1936 | Krauss et al. | 260/332 |
| 2,045,475 | 6/1936 | Krauss et al. | 260/332 |
| 2,493,072 | 1/1950 | Killian | 260/332 |
| 2,766,244 | 10/1956 | Brouillard | 260/282 |
| 2,998,402 | 8/1961 | Geiger et al. | 260/282 |
| 3,072,661 | 1/1963 | Pizzarello et al. | 546/32 |
| 3,127,412 | 3/1964 | Gaertner et al. | 546/32 X |

FOREIGN PATENT DOCUMENTS

| | | | |
|---|---|---|---|
| 114896 | 8/1969 | Denmark | 260/282 |
| 925409 | 5/1963 | United Kingdom | 546/32 |

*Primary Examiner*—Sandra M. Person

*Attorney, Agent, or Firm*—Sherman & Shalloway

[57] ABSTRACT

A method for clear-coloring of linear aromatic polyesters, which comprises mixing at least one pigment selected from the group consisting of a pigment of the formula

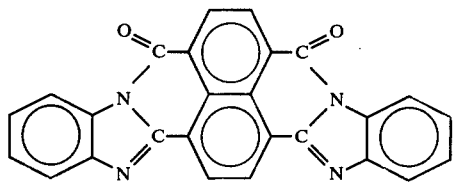

and pigments of the formula

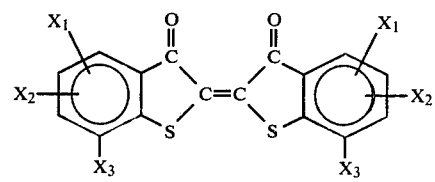

wherein $X_1$ and $X_2$ represent a hydrogen atom, a chlorine atom or a methyl group, and $X_3$ represents a chlorine atom or a methyl group, with a linear aromatic polyester, and heating the mixture to the melting temperature of the polyester to dissolve or substantially dissolve the pigment in the polyester.

16 Claims, No Drawings

METHOD FOR CLEAR-COLORING OF LINEAR AROMATIC POLYESTER

This invention relates to a coloring method, and more specifically, to a method for clear-coloring linear aromatic polyesters.

Linear aromatic polyesters are used to produce textile products, film products and other molded products. For example, polyethylene terephthalate is commercially utilized in the production of fibers and films, and polyethylene terephthalate, polypropylene terephthalate and polybutylene terephthalate, in the production of other shaped articles.

The basic requirements for coloration of linear aromatic polyesters using pigments are that (1) the pigments should have good fastness characteristics, for example they must withstand high melting temperatures (up to 300° C.) and have superior fastness to light and sublimation, and (2) the pigment particles should be finely and uniformly dispersed in the polyesters without being agglomerated. In recent years, the consumers have not been content merely with pigment-colored non-transparent pastel-like colors, but tended to demand products having brilliant and clear colors. To obtain clear-colored linear aromatic polyesters, a method of "dope dyeing" was suggested which involves mixing a dye with a polyester, and melting the mixture. Japanese Patent Publication No. 26095/68 and U.S. Pat. No. 3,401,142 disclose some anthraquinonic dyes as suitable for use in dope dyeing.

The present inventors have found that instead of such dyes, certain pigments give brilliant and clear colors when used to color linear aromatic polyesters.

Thus, the present invention provides a method for clear-coloring linear aromatic polyesters, which comprises mixing at least one pigment selected from the group consisting of a pigment of formula (I) and pigments of formula (II) below,

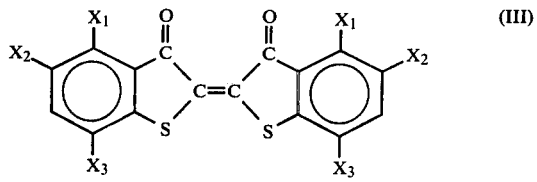
(I)

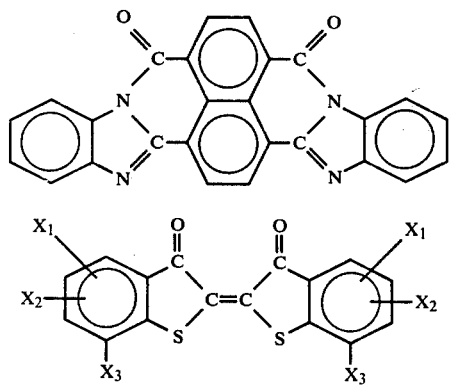
(II)

wherein $X_1$ and $X_2$ represent a hydrogen atom, a chlorine atom or a methyl group and $X_3$ represents a chlorine atom or a methyl group, with a linear aromatic polyester; and then heating the mixture to the melting temperature of the polyester to dissolve or substantially dissolve the pigment in the polyester.

Of the pigments of formula (II), those expressed by formula (III) below are preferred in this invention.

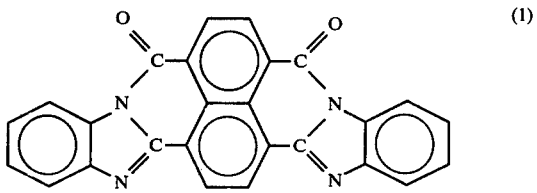
(III)

In formula (III), $X_1$, $X_2$ and $X_3$ are as defined with regard to formula (II).

Examples of especially preferred pigments in this invention are those of the following structural formulae.

(1)

(2)

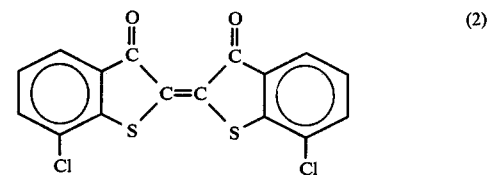

(3)

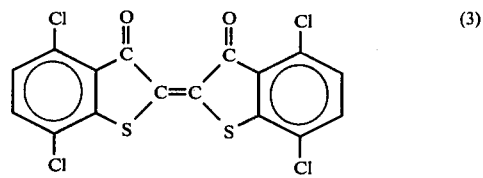

(4)

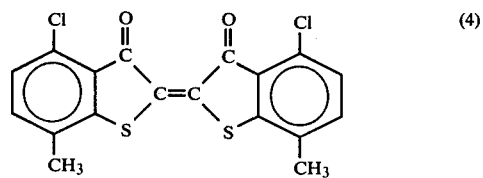

(5)

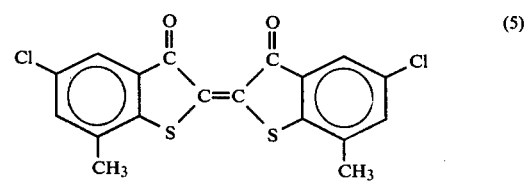

and (6)

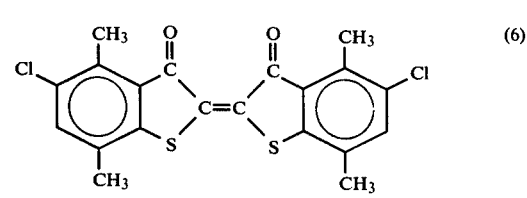

These pigments (1) to (6) are described in "Colour Index, 3rd Edition, Volume 3" (published by The Society of Dyers and Colourists with acknoledgement to The American Association of Textile Chemists and Colorists) as (1) C.I. Pigment Red 194, (2) C.I. Pigment Red 87, (3) C.I. Pigment Red 88, (4) C.I. Pigment Red 198, (5) C.I. Pigment Violet 36, and (6) C.I. Pigment Violet 38, respectively. They have a melting point of at least 300° C., and are widely used as coloring agents for printing inks, paints and lacquers. It is known that some of these pigments are used for dyeing cotton as vat dyes, and some others, for coloring polyolefins, rubbers, vinyl plastics, etc.

Investigations of the present inventors show that when the pigments of the above formula are used for coloring polypropylene, the pigment particles disperse in polypropylene to afford a dull red color or a dull reddish violet color, and when used for coloring 6-nylon, they discolor at the time of melting 6-nylon. It was found surprisingly that when these pigments are used to color linear aromatic polyesters whose melting temperatures are as high as 250° to 300° C., the pigments dissolved in the polyesters during melting, and no pigment particle is seen to disperse; and that the color imparted is a clear brillaint red color or reddish violet color, and the colored polyesters have superior fastness to heat, light and to sublimation.

The linear aromatic polyesters that can be colored by the method of this invention are linear polyalkylene terephthalates obtained by the reaction of terephthalic acid or dialkyl terephthalates with glycols of the formula $HO-CH_2)_nOH$, n being an integer of 2 to 10, or 1,4-di(hydroxymethyl)cyclohexane. These polyesters have long been known as materials for fibers and films, and methods for their production are described, for example, in U.S. Pat. No. 2,465,319 to Whinfield and U.S. Pat. No. 3,047,539 to Pengilly.

The linear aromatic polyesters, namely linear polyalkylene terephthalates containing 2 to 10 alkylene groups, as used in this application are also meant to include copolyesters based on these polyesters. These copolyesters can be obtained by replacing the starting terephthalic acid component partly by another dicarboxylic acid or hydroxycarboxylic acid, and/or the starting glycol partly by another glycol. Examples of the other dicarboxylic acid or hydroxycarboxylic acid are isophthalic acid, naphthalenedicarboxylic acid, diphenyldicarboxylic acid, hydroxyethoxybenzoic acid, hydroxypropoxybenzoic acid, p-hydroxybenzoic acid, adipic acid, and sebacic acid.

Typical examples of the linear aromatic polyesters are polyethylene terephthalate, polypropylene terephthalate, polybutylene terephthalate, and copolyesters resulting from the replacement of a part of the constituent monomers by other monomers.

The linear aromatic polyesters used in this invention have an intrinsic viscosity, measured at 25° C. in a mixture of equal amounts of tetrachloroethane and phenol, of 0.4 to 1.2.

The method of this invention is achieved by mixing a pigment with a linear aromatic polyester, advantageously mixing a finely divided pigment with a chiplike or granular linear aromatic polyester, and heating the mixture to the melting temperature of the polyester, preferably to 250° to 300° C., to dissolve or substantially dissolve the pigment in the polyester.

The amount of the pigment to be mixed with the linear aromatic polyester can vary according to the type of the pigment used, but usually, it is up to 1% by weight based on the total weight of the polyester and the pigment. When the operability of the colored polyester in spinning and other fabrication processes is considered, the amount of the pigment should desirably be 0.01 to 0.5% by weight.

The colored linear aromatic polyester produced by the method of this invention contains no detectable pigment particle, and has a brilliant and clear color. It also has superior fastness to heat, light and sublimation.

If desired, other pigments, fillers, reinforcing agents, stabilizers, etc. may be used together.

The following Examples illustrate the present invention without any intention of limiting it. All parts in these Examples are by weight.

EXAMPLES 1 and 2

While mixing 0.5 part of each of the pigments indicated below with 99.5 parts of polyethylene terephthalate having an intrinsic viscosity of 0.70, they were dried at 180° C. and 0.01 mmHg for 5 hours. The mixture was melt-spun in a customary manner at 300° C. with a residence time of 3 minutes to afford 3-denier colored filaments. The characteristics of the colored filaments are shown in the following table.

| | | | Example 1 | Example 2 |
|---|---|---|---|---|
| Pigment | | | C.I. Pigment Red 194 | C.I. Pigment Red 88 |
| Color of the colored filaments | | | Red orange | Bluish red |
| State of the pigment in the polyester (*1) | | | No pigment particle observed | No pigment particle observed |
| Fastness to | light (*2) | | 7–8 | 7–8 |
| | heat (*3) | | 4–5 | 5 |
| | washing (*4) | change | 4–5 | 4–5 |
| | | staining | 4–5 (nylon) | 4–5 (nylon) |
| | organic solvent (perchloroethylene) (*5) | change | 4–5 | 4–5 |
| | | staining | 4–5 (nylon) | 4–5 (nylon) |
| | Sublimation (*6) | | 3–4 | 5 |
| | rubbing (*7) | wet | 5 | 5 |
| | | dry | 5 | 5 |

Note
(*1) Ten milligrams of a colored filament sample was melted at 290° C. between two thin-layer glass plates, cooled and observed with a 400X microscope.
(*2) Measured on a blue scale in accordance with JIS L 0843-71 (Xenon arc).
(*3) A colored filament obtained by spinning in the same way as described above except that the residence time was changed to 15 minutes was compared with a gray scale for assessing change in color.
(*4) Measured on a gray scale in accordance with JIS L-0844-73 (70° C. ± 2° C., 45 min.).
(*5) Measured on a gray scale in accordance with JIS L 0860-74 (40° C. ± 2° C., 30 min.).
(*6) A sample colored filament was wrapped by a polyester cloth, and allowed to stand for 90 minutes in a hot air dryer at 180° C., and then the stained state of the polyester cloth was measured by using a gray scale for assessing stain in color.
(*7) Measured in accordance with JIS L 0849-71 using a gray scale for assessing stain in color.

EXAMPLE 3

C.I. Pigment Violet 36 (0.2 part), 0.3 part of C.I. Pigment Red 194 and 99.5 parts of polyethylene terephthalate (intrinsic viscosity 0.68) were uniformly mixed, and dried at 120° C. and 0.01 mmHg for 16 hours. The mixture was spun at 290° C. in a customary manner to afford 6-denier filaments having a brilliant red color. No particle of the pigments was detected by observation with a 400× microscope.

The filaments had substantially the same fastness characteristics as the filaments obtained in Examples 1 and 2.

EXAMPLE 4

C.I. Pigment Red 198 (0.3 part) and 99.7 parts of polyethylene terephthalate (intrinsic viscosity 1.0) were mixed, and dried at 180° C. for 15 hours. The mixture was then fed into a screw extruder, and molded at 290° C. to afford plates which were colored red violet.

EXAMPLE 5

C.I. Pigment Red 87 (2 parts), 6 parts of C.I. Pigment Red 194, 2 parts of carbon black and 90 parts of polyethylene terephthalate (intrinsic viscosity 0.70) were mixed, and dried at 180° C. and 0.01 mmHg for 5 hours. The mixture was extruded by a screw extruder at 290° C. to afford a master batch of a 10% pigment concentration. Five parts of the master batch was mixed with 95 parts of polyethylene terephthalate, and the mixture was dried at 130° C. and 0.01 mmHg for 10 hours. The dry mixture was spun at 290° C. and drawn in a customary manner to obtain 10-denier filaments having a brown color. Ten milligrams of a colored filament was melted and placed at 290° C. between two thin layer glass plates and observed with a 400× microscope. Only carbon black particles were seen. The resulting filaments had substantially the same fastness characteristics as the filaments obtained in Examples 1 and 2.

EXAMPLE 6

C.I. Pigment Red 194 (0.3 part) and 99.7 parts of reinforced polybutylene terephthalate (intrinsic viscosity 0.7, containing 30% by weight of glass fibers) were mixed, and dried at 120° C. under atmospheric pressure for 4 hours. The dried mixture was molded at 250° C. to afford plates uniformly colored red violet.

EXAMPLE 7

C.I. Pigment Violet 38 (0.2 part) and 99.8 parts of polybutylene terephthalate (intrinsic viscosity 0.8) were mixed, and dried. The mixture was molded at 250° C. to afford plates colored red violet. A colored object was prepared from the plate, and observed with a 400× microscope. No particle of the pigment was detected, and the color was clear.

What we claim is:

1. A method for clear-coloring of a linear aromatic polyester having an intrinsic viscosity, measured at 25° C. in a mixture of equal amounts of tetrachloroethane and phenol, of 0.4 to 1.2, which comprises mixing at least one pigment selected from the group consisting of a pigment of the formula

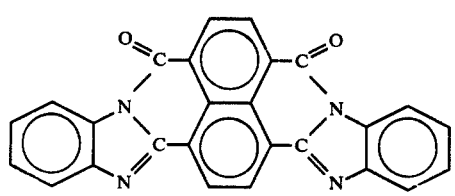

and pigments of the formula

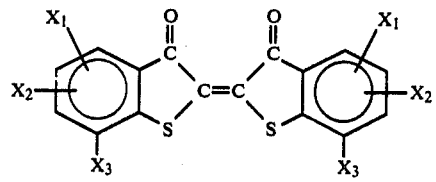

wherein $X_1$ and $X_2$ represent a hydrogen atom, a chlorine atom or a methyl group, and $X_3$ represents a chlorine atom or a methyl group and wherein the $X_1$, $X_2$ and $X_3$ moieties may be the same or different, with a linear aromatic polyester, and heating the mixture to the melting temperature of the polyester to dissolve or substantially dissolve the pigment in the polyester.

2. The method of claim 1 wherein the pigment is expressed by the formula

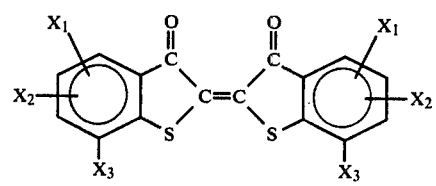

wherein $X_1$ and $X_2$ represent a hydrogen atom, a chlorine atom or a methyl group, and $X_3$ represents a chlorine atom or a methyl group wherein the $X_1$, $X_2$ and $X_3$ moieties may be the same or different.

3. The method of claim 2 wherein the pigment is

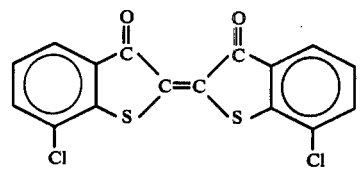

4. The method of claim 2 wherein the pigment is

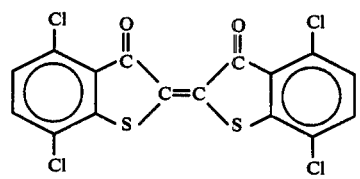

5. The method of claim 2 wherein the pigment is

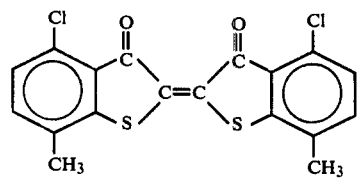

6. The method of claim 2 wherein the pigment is

7. The method of claim 2 wherein the pigment is

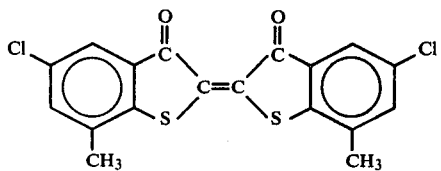

8. The method of claim 1 wherein the pigment

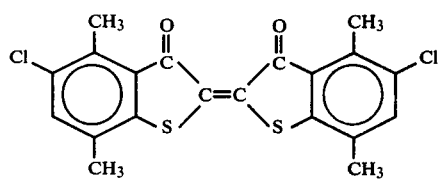

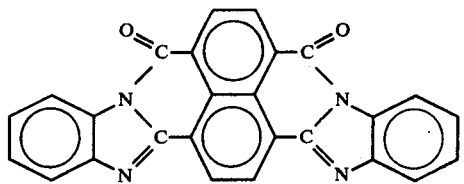

9. The method of claim 1 wherein said linear aromatic polyester is a linear polyalkylene terephthalate containing 2 to 10 alkylene groups.

10. The method of claim 2 wherein said linear aromatic polyester is a linear polyalkylene terephthalate contain 2 to 10 alkylene groups.

11. The method of claim 1 wherein the mixture of pigment and polyester is heated to a temperature in the range of 250° to 300° C. to dissolve or substantially dissolve the pigment in the polyester.

12. The method of claim 2 wherein the mixture of pigment and polyester is heated to a temperature in the range of 250° to 300° C. to dissolve or substantially dissolve the pigment in the polyester.

13. The method of claim 1 wherein the total amount of pigment is up to 1% by weight based on the total weight of the polyester and the pigment.

14. The method of claim 2 wherein the total amount of pigment is up to 1% by weight based on the total weight of the polyester and the pigment.

15. The method of claim 1 wherein the total amount of pigment is from about 0.01 to 0.5% by weight, based on the total weight of the polyester and pigment.

16. The method of claim 2 wherein the total amount of pigment is from about 0.01 to 0.5% by weight, based on the total weight of the polyester and pigment.

* * * * *